United States Patent [19]

Gardner et al.

[11] Patent Number: 4,977,218

[45] Date of Patent: Dec. 11, 1990

[54] CARBOXYLATED RUBBER PARTICLES AS TOUGHENERS FOR FIBER REINFORCED COMPOSITES

[75] Inventors: Hugh C. Gardner; Richard H. Newman-Evans, both of Somerville, N.J.

[73] Assignee: Amoco Corporation, Chicago, Ill.

[21] Appl. No.: 249,597

[22] Filed: Sep. 26, 1988

[51] Int. Cl.$^5$ ................................................. C08F 8/00
[52] U.S. Cl. ................................ 525/329.3; 525/329.7; 525/330.3; 525/332.8; 525/332.9; 525/333.1; 525/333.2; 525/386
[58] Field of Search ............... 525/329.3, 329.7, 330.3, 525/332.8, 332.9, 333.1, 333.2

[56] References Cited

U.S. PATENT DOCUMENTS

| | | | |
|---|---|---|---|
| 3,895,064 | 7/1975 | Brode et al. | 260/571 |
| 4,488,948 | 5/1984 | Tsubaki et al. | 528/95 |
| 4,517,321 | 5/1985 | Gardner et al. | 523/400 |
| 4,579,885 | 4/1986 | Domeier et al. | 523/400 |
| 4,604,319 | 8/1986 | Evans et al. | 428/290 |
| 4,608,404 | 8/1986 | Gardner et al. | 523/400 |
| 4,654,405 | 3/1987 | Grant et al. | 525/391 |
| 4,656,207 | 4/1987 | Jabboner et al. | 523/400 |
| 4,656,208 | 4/1987 | Chu et al. | 523/400 |
| 4,680,076 | 7/1987 | Bard | 156/306.9 |
| 4,686,250 | 8/1987 | Qureshi | 523/440 |
| 4,740,552 | 4/1988 | Grant et al. | 525/66 |
| 4,783,506 | 11/1988 | Gawin | 525/109 |

FOREIGN PATENT DOCUMENTS

| | | |
|---|---|---|
| 0133280 | 2/1985 | European Pat. Off. . |
| 0252725 | 1/1988 | European Pat. Off. . |
| 0274899 | 7/1988 | European Pat. Off. . |
| 1306231 | 2/1973 | United Kingdom . |

OTHER PUBLICATIONS

"Development of Resin for Damage Tolerant Composites, a Systematic Approach", Diamont and Molton; 29th National SAMPE Symposium, Apr. 3-5, 1984, published in SAMPE Quarterly, Oct. 1984, pp. 13-21.

"Spray Dryers" in the *Encyclopedia of Polymer Science and Technology*, vol. 5, p. 215, published in 1966 by John Wiley and Sons, Inc.

"Blue Book 1987: Materials, Compounding Ingredients and Machinery for Rubber," published in 1987 by Rubber World Magazine, Lippincott and Petro, Akron, Ohio, pp. 424, 425, 426, 503, 504, 507 and 508.

"Dictionary of Rubber," published 1974 by Halsted Press, New York, pp. 101, 108, 109 and 236-239.

*Primary Examiner*—Bernard Lipman
*Attorney, Agent, or Firm*—Richard J. Schlott; William H. Magidson; Ralph C. Medhurst

[57] ABSTRACT

Preformed carboxylated rubber particles are effective for toughening fiber reinforced composite structures based on thermoset resins such as epoxy resin formulations. The composites are effectively toughened by adding the carboxylated rubber particles to the matrix resin prior to curing the composite.

6 Claims, No Drawings

CARBOXYLATED RUBBER PARTICLES AS TOUGHENERS FOR FIBER REINFORCED COMPOSITES

BACKGROUND OF THE INVENTION

This invention relates to composite materials and more particularly to tough, impact resistant fiber-reinforced composites. Still more particularly, this invention relates to improved matrix resin formulations for use in producing fiber reinforced composites, and to particles useful in toughening fiber reinforced composites.

Fiber reinforced composites are high strength, high modulus materials which are finding wide acceptance for use in sporting goods and in producing consumer items such as appliances. Such materials are also finding increased acceptability for use as structural components in automotive applications, as components of buildings and in aircraft. Typically, the composites used in structural applications comprise structural fibers in the form of continuous filaments or woven cloth embedded in a thermosetting or thermoplastic matrix. Such composites may exhibit considerable strength and stiffness, and the potential for obtaining significant weight savings makes them highly attractive for use in primary structural applications as a metal replacement. However, acceptance for many structural applications has been limited by the fact that many of the composite materials presently available are brittle. The inability of such composites to withstand impact while retaining useful tensile and compression strengths has been a serious problem for many years. Compensating for the low impact resistance of such materials may ordinarily be accomplished by increasing the amount of material employed, which increases costs, reduces the weight savings that might otherwise be realized and may make them unacceptable for many uses.

The composites industry has long been involved in finding ways to overcome these deficiencies. Considerable effort has been expended over the past two decades directed toward the development of composites with improved fracture toughness. Inasmuch as most of the commonly employed matrix resins, as well as many of the reinforcing fibers, are generally brittle much of that effort has gone into a search for component replacements having better toughness characteristics. As a consequence, the search for toughened matrix resins has become the subject of numerous recent patents and publications.

For decades, the plastics industry has used rubber modifiers to toughen rigid, frequently brittle thermoplastic and thermoset engineering resins. Most often the rubber is dispersed in the form of particles throughout the rigid resin. Various means for altering the interaction between the rubber particles and the rigid phase to improve the effectiveness of the rubber component have also been explored. For example, the rubber components have been modified by grafting to change compatibility with the rigid phase, and adding reactive functional groups to the rubber to promote bonding to the rigid phase has also been shown to be effective. Other approaches have included the combining of dissimilar resins to form blends and alloys with improved properties.

The methods used for toughening engineering resins have been adapted for the toughening of the matrix resins commonly used in composite structures, as shown for example by Diamont and Moulton in "Development of Resin for Damage Tolerant Composites—A Systematic Approach", 29th National SAMPE Symposium, April 3–5, 1984. The forming of alloys and blends by adding a more ductile thermoplastic such as a polysulfone to an epoxy resin formulation has also been shown to improve the ductility of the epoxy resin and provide enhanced toughness, according to British patent 1,306,231, published Feb. 7, 1973. More recently, combinations of an epoxy resin with terminally-functional thermoplastics were shown to exhibit enhanced toughness. See U.S. Pat. No. 4,498,948. Still more recently, curable combinations of epoxy resins and thermoplastics with reactive terminal functionality were also said to improve the toughness of specifically-formulated matrix resins, provided that the neat resin after curing exhibits a specific phase-separated morphology having a cross-linked glassy phase dispersed within a glassy continuous phase. See U.S. Pat. No. 4,656,208. Further improvements are said to be achieved by including a reactive rubber component which is said to be contained within the cross-linked dispersed glassy phase. See U.S. Pat. No. 4,680,076.

Although the addition of rubber, thermoplastics and the like generally improves the ductility and impact resistance of neat resins, the effect on the resulting composites is not necessarily beneficial. In many instances the increase in composite toughness may be only marginal, and a reduction in high temperature properties and in resistance to environmental extremes such as exposure to water at elevated temperatures frequently is seen. Composite structures that rely on complex manufacturing methods or on unique resin morphologies that are difficult to reproduce for achieving improvements in toughness may require an impractical degree of control during fabrication, adding to the production costs and often resulting in erratic performance and poor reliability.

An alternative approach to producing toughened composites has been the development of layered composite structures having layers formed of fibers imbedded in a matrix resin alternated with layers formed of a thermoplastic resin, described in Japanese patent application 49-132669, published May 21, 1976. More recently, in U.S. Pat. No. 4,604,319, there were disclosed layered fiber-resin composites having a plurality of fiber reinforced matrix resin layers inter-leafed with thermoplastic layers adhesively bonded to the reinforced matrix resin layers. Inter-leaf structures are ordinarily produced by impregnating continuous fiber to form prepreg, then laying up the composite by alternating prepreg with sheets of thermoplastic film. The laid-up structure is then subjected to heat and pressure, curing the matrix resin and bonding the layers. The patent also discloses inter-leaf layers which comprise a thermoplastic filled with a reinforcing material such as chopped fibers, solid particles, whiskers and the like.

Although inter-leafed composite structures with improved toughness have been disclosed, there has often been some sacrifice in other physical properties, including a reduction in glass transition temperatures together with an increase in creep at high temperatures. Further difficulties with such composites may include a loss in stiffness for many such compositions, adhesive failure that may occur between layers formed of dissimilar resins and property deterioration during use due to poor solvent resistance. In addition, prepreg based on thermoplastic resin generally are lacking in tack, which complicates their fabrication into composites and increases the degree of skill needed to fabricate complex structures. This may in turn result in increased scrap losses and a need for more complex quality control procedures, increasing manufacturing costs in order to achieve an acceptable level of reliability.

The compositions and methods presently available for producing toughened composites thus require further improvement. Composites having improved resistance to impact and particularly those with better compressive strength after impact would be a useful advance in the art, and reliable methods for producing such toughened composites could find rapid acceptance, displacing the more complex and expensive manufacturing processes currently available for these purposes.

SUMMARY OF THE INVENTION

The present invention is directed to toughened layered composite structures comprising continuous fiber and an improved thermoset matrix resin formulation toughened by including finely-divided carboxylated rubber particles. More particularly, the toughened layered composite structures include a plurality of discrete layers or plies comprising continuous fiber imbedded in an improved thermoset matrix resin formulation. The improvement comprises adding preformed particles formed of a carboxylated rubber to the matrix resin component within the inter-ply spacing of the layered composite prior to curing. The particles act as a modifier to improve the toughness of the cured composite structures.

DETAILED DESCRIPTION

The toughened composite structures of this invention comprise discrete layers formed of continuous fiber embedded in a matrix resin, the layers being separated or spaced normally apart by laminar regions or layers comprising matrix resin filled with a particulate modifier.

The Matrix Resins

The matrix resins useful in forming toughened composites according to the practice of this invention are the resin formulations commonly used in the fiber-reinforced composites art and may include both thermosetting and thermoplastic materials. However, thermosetting resins will be preferred for most applications and the thermoset resins useful in this application will include those most commonly employed for making fiber reinforced composites such as epoxy resins, cyanate resins, bismaleimide resins, BT resins comprising a combination of cyanate and bismaleimide resin components, mixtures of such resins and the like, as well as the widely used cross-linkable polyester resins. Such resins, and particularly formulations based on curable epoxy resins, are generally known to possess low ductility and consequently to be quite brittle. Composite structures based on such resins are therefore greatly benefited when toughened according to the teachings of this invention.

The preferred matrix resin formulation will thus be based on a thermoset resin and in particular on the well known and widely used epoxy formulations comprising in general an epoxy resin and an appropriate curing agent such as a diamine hardener or the like. The epoxy formulations may optionally include an appropriate curing agent and such additional components as are commonly employed in the thermoset composite art.

The epoxy resins which may be employed are curable epoxy resins having at least two epoxy groups per molecule. Such resins are commonly employed for producing composite materials, and many are readily available from commercial sources. Examples of such resins are polyglycidyl compounds, including the reaction products of polyfunctional compounds such as alcohols, phenols, cycloaliphatic carboxylic acids, aromatic amines or aminophenols with epichlorohydrin, and epoxidized dienes or polyenes, including cycloaliphatic epoxides and cycloaliphatic epoxide-esters. Mixtures of epoxy resins may also be used. Preferred epoxides include Bisphenol A epoxides, epoxy novolacs, cycloaliphatic epoxy ethers and glycidyl amines. A wide variety of these epoxy resins are available from commercial sources under trade names such as PGA-X from Sherwin Williams Company, DEN 431 from Dow Chemical Company, Glyamine 125 from F.I.C. Corp. and MY-720 from Ciba-Geigy Corp.

Diamine hardeners which may be used include the aromatic diamines conventionally employed in formulating epoxy resins, such as for example, 4,4'-diaminodiphenyl ether, 4,4'-diaminodiphenyl methane, 4,4'-diaminodiphenyl sulfone, 3,3'-diaminodiphenyl sulfone, p-phenylene diamine, m-phenylene diamine 4,4'-diaminodiphenyl propane, 4,4'-diaminodiphenyl sulfide, trimethylene glycol bis(p-aminobenzoate) and the like, as well as their various position isomers. Also useful are the variety of polynuclear aromatic diamine hardeners such as those disclosed for example in U.S. Pat. Nos. 4,579,885 and 4,517,321, and U.S. patent 4,686,250, all incorporated herein by reference, as well as xylylene diamine, di-(aminomethyl)-cyclohexane, dicyandiamide and the like. The various diamine hardeners may be used alone or in combination.

Epoxy formulations which, upon curing, form a phase-separated matrix resin with a glassy discontinuous phase dispersed in a glassy continuous phase may also be employed. Methods for the preparation of such materials and the components useful in their preparation are more fully described in U.S. Pat. Nos. 4,656,207 and 4,656,208, the teachings of which are incorporated herein by reference.

In general, the references describe combinations of epoxy resins and terminally-reactive oligomers which are said to exhibit greater toughness than compositions prepared without such oligomers. The oligomers useful in forming phase-separated matrix resins according to this invention may be described as aromatic oligomers having a number average molecular weight of greater than about 1000 and preferably greater than about 2000, with terminal functionality capable of reacting with the epoxy resin or with an added amine hardener or similar curing aid. Typical of such oligomers are the amine-terminated polymers obtained from the reaction of an aminophenol such as p-aminophenol, m-aminophenol, 3-amino-5-methylphenol and the like, as well as polynuclear analogs thereof such as 4-amino-4'-hydroxy-biphenyl, 4-(4-aminophenoxy) phenol, 2-(4-aminophenyl)-2-(4-hydroxyphenyl) propane and the like, and appropriate ratios of a dihaloaromatic compound and a dihydric phenol. A variety of oligomers having a plurality of reactive amine groups are possible by such means, including those disclosed for example in U.S. Pat. Nos. 3,895,064, 4,608,404 and 4,746,718. Oligomers having other reactive functional groups are also known, including those with epoxy functionality shown in U.S. Pat. 4,448,948, and these oligomers may also be useful in forming phase separated matrix resins.

Suitable epoxy resin formulations may be prepared according to methods and practices well known and widely used in the resin art. Generally the matrix resin formulations will comprise greater than 6 pbw, preferably from 6 to about 150 pbw, of a diamine hardener, per hundred parts by weight epoxy resin. Where a reactive oligomer is employed, the formulation will include greater than 10 parts by weight (pbw), preferably from 10 to 200 pbw of the reactive oligomer component per hundred parts by weight epoxy resin. The amount of each component selected will depend upon the molecular weights of the individual components and the molar ratio of reactive amine (N-H) groups to epoxy groups desired in the final matrix resin system. For most prepreg and composite applications, sufficient diamine hardener and amine-functional oligomer will be used to provide a molar ratio of N-H groups to epoxide groups in the range of from about 0.3/1 to 1.8/1, preferably from 0.4/1 to 1.3/1. The component ratios for compositions based on oligomers with other functionality will be similarly determined according to conventional epoxy resin formulating practices.

The formulations may further include a thermoplastic polymer. Such materials may enhance the ductility and impact resistance of the cured resin formulation, further contributing to the toughness of the resulting composite, and are often effective to increase the viscosity and film strength of the uncured resin, improving processability and handling during impregnating operations. Although any of a variety of thermoplastics known in the art for use in combination with epoxy resins may be employed, including polyaryl ethers such as polyaryl sulfones, polyether ketones, polyphenylene ethers and the like, as well as polyarylates, polyamides, polyamide-imides, polyetherimides, polycarbonates, phenoxy resins and the like, to be effective for improving the viscosity, processability and handling characteristics, the thermoplastic selected will be soluble in the uncured epoxy resin formulation. The proportion of thermoplastic employed will depend in part upon the thermoplastic selected and the particular end use envisioned. However, for most purposes, the formulation will comprise from 0 to 30 pbw of thermoplastic per 100 pbw of the combined diamine hardener and epoxy resin components.

The epoxy formulations may additionally include an accelerator to increase the rate of cure. Any of the accelerators known and used in the epoxy resin art may be employed in conventional amounts, including Lewis acid:amine complexes such as $BF_3$:monoethylamine, $BF_3$:triethanol amine, $BF_3$:piperidine and $BF_3$:2-methylimidazole; amines such as imidazole, 1-methyl imidazole, 2-methyl imidazole, N,N-dimethylbenzylamine and the like; acid salts of tertiary amines such as the p-toluene sulfonic acid:imidazole complex and the like, salts of trifluoromethane sulfonic acid such as FC-520 (obtained from 3-M Company), organophosphonium halides, dicyandiamide and 1,1-dimethyl-3-phenyl urea. Mixtures of such accelerators may also be employed. For some end uses it may also be desirable to include dyes, pigments, stabilizers, thixotropic agents and the like, and these and other additives may be included as needed at levels commonly practiced in the composite art.

The Fibers

The matrix resin formulation will be combined with continuous fiber reinforcement or structural fibers and a particulate modifier in forming toughened composites according to the practice of this invention. Suitable fibers may be characterized in general terms as having a tensile strength of greater than 100 kpsi, a tensile modulus of greater than two million psi, and a decomposition temperature of greater than 200° C. Fibers useful for these purposes include carbon or graphite fibers, glass fibers and fibers formed of silicon carbide, alumina, titania, boron and the like, as well as fibers formed from organic polymers such as for example poly(benzothiazole), poly(benzimidazole), polyarylates poly(benzoxazole), aromatic polyamides, polyaryl ethers and the like, and may include mixtures comprising two or more such fibers. Preferably the fibers will be selected from carbon fibers and aromatic polyamide fibers such as the fibers sold by the DuPont Company under the tradename Kevlar. The fibers may be used in the form of continuous tows of typically from 500 to 420,00 filaments, as continuous unidirectional tape or as woven cloth.

The Particulate Modifiers

The particulate modifiers employed in the practice of this invention may be characterized as comprising carboxylated rubber particles, and more particularly as being a finely-divided, carboxylated, cross-linked rubber. Particles formed of carboxylated rubbers exhibit particularly good adhesion to the matrix resin, possibly by becoming chemically bound to the matrix resin or simply by having an improved affinity for the matrix resin due to the presence of polar groups at the particle surface.

The particles are further characterized as rigid, meaning that the rubber particles will exhibit sufficient thermal resistance, hardness and rigidity to resist being melted, compressed or flattened under the pressures and temperatures that will normally be encountered during the fabricating and curing of the laminate. Typically, rubber particles having a hardness value above about D-50 (Shore), and which are substantially insoluble in the matrix resin will be preferred. Such rubber particles will be dispersed in the matrix resin without dissolving or otherwise losing their particulate character, and have sufficient rigidity to withstand processing. Rubbers having glass transition temperatures below about 15° C. or hardness values below about D-50 (Shore), and thermoplastic rubbers having a melt temperature substantially below the expected cure temperature may melt or significantly soften during composite fabrication and thus will not be suited for use as particulate modifiers in the practice of this invention. However, it is well known that the hardness, glass transition temperature and softening temperature of rubbers may be increased by grafting and by crosslinking or curing the rubber, and such processes may be employed with soft or low Tg rubbers to provide a carboxylated rubber having, in its final particle form, a glass transition temperature above about 15° C and the necessary hardness for use in the practice of this invention.

Suitable carboxylated rubbers include conventional diene and olefin rubbers having, or modified to include, from about 0.1 to about 5 wt%, preferably from about 0.5 to about 3 wt% carboxyl or carboxamide functionality. Representative of such diene rubbers are the variety of well known rigid, possibly cross-linked copolymers of butadiene or isoprene including for example the diene-acrylonitrile copolymers widely available as nitrile rubbers, copolymers of vinyl aromatic monomers and diene monomers such as the styrene-butadiene copolymers known as SBR rubbers, and terpolymers of dienes with acrylonitrile and styrene or vinyl toluene, all of which, when modified with the desired level of carboxyl functionality, may be described as carboxylated diene rubbers. Many such rubbers having Tg values above 15° and the desired carboxylic functionality are readily available from commercial sources. Also useful are rubbery copolymers of acrylate esters with carboxyl functionality, which may be described as carboxylated acrylic rubbers. Acrylic rubbers with the desired level of carboxylic functionality and having Tg values in the range of 20° to 36° and even higher are also commercially available in a variety of forms. Other polymers which may be similarly modified to include carboxyl functionality include rubbery copolymers and particularly graft copolymers of styrene, vinyltoluene or the like and optionally one or more additional copolymerizable vinyl monomers on a rubbery polymeric substrate, using a sufficiently high level, preferably greater than 60 wt%, of the rubbery substrate component. Specific examples include rubbery acrylonitrile-butadiene-styrene (ABS) polymers, methylmethacrylate-butadiene-acrylonitrile-styrene (MABS) polymers and the like.

Modification of rubbers to include carboxyl functionality may be accomplished by a variety of well known processes, including copolymerizing the rubber monomers with a suitable copolymerizable carboxylic monomer or by grafting the preformed rubber in solution, suspension or latex form with carboxylic compounds such as maleic anhydride, maleimide, acrylic acid, itaconic acid or the like. Other methods for providing carboxylated rubbery polymers having the necessary rigid character include grafting the polymers in particle form with mixtures of a rigid monomer and a copolymerizable carboxylic compound to provide particles having a rigid outer shell with reactive carboxylic functionality, and many such core-shell particulate modifiers are also known and commercially available. Also suitable are post reaction processes for carboxylating rubbery diene copolymers, olefin rubbers and the like, as recently described in U.S. 4,740,552 and 4,654,405.

The carboxylated rubbers suitable for use as rubber particles according to the practice of this invention may thus be described as carboxylated rubbers having a Tg greater than about 15° C which may be selected from the group of carboxyl group - containing rubbers consisting of carboxylated diene rubbers, carboxylated acrylic rubbers, and mixtures thereof.

The carboxylated rubber particles may be solid, porous or hollow and take any convenient shape, and may for example be formed into bead-like spheres or oblate spheroids from solutions, dispersions or suspensions of the rubber by a variety of processes including spray drying, flash evaporation, precipitation or coagulation or the like. The particles may also be produced from bulk material by a pulverizing or grinding process, optionally under cryogenic conditions, to provide particles rough and irregular in shape. Suitable particles may also be formed by coating a a carboxylated rubber onto a particulate support having the appropriate size, then cross-linking the carboxylated rubber coating. For example, SAN and polyolefin resins, as well as SBR, nitrile rubber and the like are available as particles in the form of a latex, suspension or dispersion. Such particles may be coated individually with a carboxylated rubber together with appropriate curing additives, cured to form a cross-linked coating on the individual particles, then collected in particle form by a spray-drying operation or the like.

The Composite Structures

The toughened composite structures of this invention comprise discrete layers formed of continuous fiber embedded in a matrix resin, the layers or plies being separated or spaced normally apart, the layer surfaces defining laminar regions or spacing layers comprising matrix resin filled with the particulate modifier. The particulate modifier serves to separate the plies, and the thickness of the ply spacing will thus be directly related to the particle size, particularly where the particles are substantially spheroidal in shape.

The filled resin spacing layers separating the plies will have an average thickness lying in the range of from about 1 microns to about 75 microns. It appears that the effectiveness of such filled matrix resin layers in toughening the composite may be greatest for layers substantially uniform in thickness, which could best be accomplished by using particles which are substantially uniform in size. As used herein, the term particle size refers to the particle dimension determining the ply separation, ordinarily the particle thickness or smallest diameter. Inasmuch as it will not be practical in most instances to obtain particles uniform in size throughout, the particulate modifiers will ordinarily comprise mixtures of particles encompassing a variety of particle sizes, with the majority of the particles lying in the range of from 1 to about 75 microns, and these mixtures will be highly effective in toughening composites.

The proportion of each component employed in fabricating the toughened composites of this invention will depend in part upon the end use envisioned, as well as on the particular resin, fiber and particulate materials selected. Overall, the composites will comprise from about 20 to about 80 wt% continuous fiber, the balance comprising matrix resin and particulate modifier with the particulate filler amounting to from 1 to about 25 wt% based on combined weight of the particulate modifier and the matrix resin formulation.

Composite Fabrication

Methods ordinarily used for the production of layered composites may be readily adapted for fabricating the composites of this invention. Most commonly, such composites are formed from impregnated tape comprising uniformly disposed, parallel filaments of continuous fiber, or from resin-impregnated fabric woven from continuous fiber tow. These impregnated fiber structures, designated prepreg, may be produced by impregnating tape or fabric with matrix resin formulation in an uncured state using any convenient method including melt coating, calendaring, dip impregnation with a resin solution or molten resin, melt pressing the tape or fabric into a film of the matrix resin or the like.

The composite will then be formed by laying up sheets or tapes of the prepreg to form a layered stack or lay-up, and curing the lay-up under pressure, usually with heat. The prepreg layers, each comprising continuous fiber and matrix resin in uncured form, will have their adjoining surfaces adhered upon curing to form a single structure having discrete layers of continuous fiber embedded in an essentially continuous and substantially homogeneous matrix resin phase.

In forming the toughened composites of this invention, it will be necessary to distribute the particulate modifier uniformly between each of the prepreg layers. A variety of methods may be used for this purpose, and the placing of particulate modifier at a surface of the prepreg may be carried out as a separate step prior to or during the lay-up operation, or integrated into the step of impregnating the tape or woven fabric. The former will be referred to as two-step processes, while the latter are termed one-step processes.

Methods for carrying out the two-step process include physically distributing the particles by a sprinkling, spraying, spreading or similar operation on a surface of each prepreg tape or sheet during the lay-up operation; dispersing the particulate modifier uniformly in liquid matrix resin formulation and coating the mixture on a surface of the prepreg; forming a film of particulate modifier-filled matrix resin formulation and inter-leafing the prepreg layers with the film during the lay-up operation and the like. Two-step methods based on a coating or inter-leafing step provide added matrix resin, ensuring that adequate matrix resin is available to fill the laminar region between the plies formed by the particulate modifier.

In the alternative one-step method, the particulate modifier may be placed on a surface of the prepreg during the impregnation step by dispersing the particulate modifier into the matrix resin and then carrying out the impregnation step. In this process, a fiber structure having a surface layer of the filled resin may be formed for example by placing a film of filled resin on a surface of tape or fabric, or by coating the filled resin directly onto the surface. The continuous fiber is then embedded in the matrix resin by heating the fiber-and-resin structure in a melt-pressing or ironing operation. The matrix resin becomes molten and a portion flows into the fiber structure, leaving behind at the tape or fabric surface matrix resin filled with those particles too large to enter the interstices of the fiber structure.

The one-step process may be viewed as a filtering operation whereby the fiber structure acts as a filter, passing matrix resin while retaining at the surface those particles larger than the openings between the fibers.

When combining the carboxylated rubber particles with the epoxy resin in preparing the matrix resin formulation, it may be beneficial to heat the mixture of epoxy resin and rubber particles for a period of time at a temperature in the range of from about 50° to about 150° C, optionally in the presence of the oligomer, as a preliminary process step prior to adding the amine hardener. The preliminary heating step may be used to promote an initial reaction between the matrix resin and the carboxyl groups attached to the rubber particle, thereby grafting the surface of the particle with matrix resin and improving compatibility.

In the art there are disclosed specific processes for preparing prepreg from an epoxy-based, multi-phase matrix resin formulation for use in making toughened composites. According to the disclosure, the preferred process is an in situ procedure for preparing the rubber particles whereby a solution of the cross-linkable rubber polymer was dispersed into the epoxy resin and the solvent was then removed by distillation. The rubber component disclosed was Hycar 1472 from B.F. Goodrich Company, described as a carboxy-functional, cross-linkable butadiene-acrylonitrile rubber which is soluble in acetone. The rubber has a published Tg of −19° C. The resulting mixture, which may be described as a dispersion of the soluble Hycar 1472 rubber in epoxy resin, was then stirred with catalysts for curing the rubber under conditions that crosslink and graft the rubber, forming a suspension of cross-linked rubber particles. The size of the rubber particles produced by the process is highly variable and greatly depends upon agitation as well as on other process variables.

The rubber-filled resin was then formed into a prepreg by preparing films, combining the films with fiber into a sandwich, and pressing to form a prepreg having rubber particles in the resin at the prepreg surfaces. According to the disclosure, the matrix resin, upon curing in a subsequent composite fabricating step, formed the requisite phase-separated morphology with continuous and discontinuous glassy phases and dispersed rubber particles.

In the practice of the instant invention, pre-formed carboxylated rubber particles having the preferred size and shape are added to the resin by conventional methods, thereby avoiding the complex and difficult in situ particle-forming process steps described in the art. The lay-up and curing steps used in preparing the toughened composite structures of the instant invention will be conventional and may be carried out using any of the variety of conventional processing devices and equipment and employ conventional process steps using adaptations and modifications as are ordinarily employed in the composite art.

The invention will be better understood by consideration of the following Examples, which are provided by way of illustration. In the Examples, all parts are by weight, and all temperatures are given in Centigrade unless otherwise noted.

EXAMPLES

The following materials and formulations are employed in the Examples.

| Epoxy Resin Formulations | |
|---|---|
| Component | pbw |
| EP-1: | |
| bis (2,3-epoxycyclopentyl) ether, epoxy resin | 40.8 |
| 4,4'-bis(3-aminophenoxy) diphenyl sulfone, amine hardener | 48.1 |
| BF3:TEA boron trifluoride:triethanolamine complex; curing aid/accelerator | 0.9 |
| PEI Polyether imide obtained as Ultem 1000 from General Electric Company | 10.2 |
| total: | 100.0 |
| EP-2: | |
| N,N,N',N' tetraglycidyl 4,4'-methylene dianiline, MY 721 epoxy resin from Ciba Geigy | 25 |
| epoxidized novolac resin DEN 431 epoxy resin from Dow Chemical Company | 32 |
| trimethylene glycol bis(p-aminobenzoate), Polacure 740M amine hardener from Polaroid Corp. | 32 |
| Polyarylate; the polymeric isophthalate and terephthalate esters of bisphenol A; Ardel D-100 from Amoco Performance Products, Inc. | 11 |
| total: | 100 |
| EP-3: | |
| bis (2,3-epoxycyclopentyl) ether, epoxy resin | 42.8 |
| 4,4'-bis(3-aminophenoxy) diphenyl sulfone, amine hardener | 49.7 |
| BF3:TEA; see EP-1 | 0.9 |
| PEI; see EP-1 | 7.4 |
| total: | 100.8 |
| EP-4: | |
| N,N,N'N'-tetraglycidyl-4,4'-methylene | 28.0 |

-continued

Epoxy Resin Formulations

| Component | pbw |
|---|---|
| dianiline, MY 9612 epoxy resin from Ciba Geigy | |
| O,N,N-triglycidyl p-aminophenol, MY 0510 epoxy resin from Ciba Geigy | 37.0 |
| 3,3'-diaminodiphenyl sulfone, HT 9719 amine hardener from Ciba Geigy | 18.6 |
| N,N-dimethyl-N'-phenyl urea, Omicure 94 cure accel. from Omicron Chemicals | 0.4 |
| PES Polyether sulfone, Victrex 200P from ICI Company | |
| total: | 100.0 |

Particulate Modifiers

| abbrev. | composition |
|---|---|
| ABS-1 | Spray-dried particles of carboxylated styrene-butadiene-acrylonitrile terpolymer with approximately 0.038 equivalents carboxyl functionality per 100 g, a Tg of 26° and ave. particle size 13 microns, as received; prepared from Hycar 1578X1 latex, by B. F. Goodrich Company. The carboxyl content of these latex terpolymers is typically in the range of from 1 to 4 wt % |
| ABS-2 | A mixture of equal weights of as-received ABS-1 particles and acid-treated ABS-1 particles obtained by slurrying with aqueous hydrochloric acid at a pH of 2-3, washing with water and with methanol, drying at 80° in a vacuum oven, milling and then sieving (200 mesh). |
| Acrylic-1 | Spray-dried particles of a carboxylated acrylic rubber with a Tg of 20°, ave. particle size 13 microns, prepared from Hycar 26288 latex B. F. Goodrich Company. The carboxyl content is estimated to be approximately 2 wt %. |

Fibers

The carbon fiber used in the Examples was Thornel ® T650-42 grade carbon fiber from Amoco Performance Products, Inc. This fiber typically has a filament count of 12,000 filaments per tow, a yield of 0.44 g/m, a tensile strength of 730 kpsi, a tensile modulus of 42 mpsi and a density of 1.78 g/cc.

Test Procedures

Compression After Impact Test.

This procedure, referred to as the Compression After Impact test or CAI, is generally regarded as standard test method in the industry. The test specimens are panels measuring 6×4 in., cut from the fiber-reinforced composite sheets. The panels are first impacted by being subject to an impact of 1500 in-lbs/in at the center in a Gardner Impact Tester, using a ⅝ in. indenter. The impacted panel is then placed in a jig and tested edgewise for residual compressive strength. The details are further described in "NASA Contractor Report 159293", NASA, August, 1980.

Glass Transition Temperature (Tg).

Values for Tg were obtained by standard differential thermal analysis (DTA) techniques; the heating rate was 10°/min.

The methods of the following Examples are representative of those that may be employed for preparing the resin formulations, prepreg and composites useful in the practice of this invention. The processes will be generally recognized by those skilled in the art as processes and methods commonly employed for the production of thermoset resin formulations and composites.

Control Example A.

An EP-1 resin formulation was prepared by heating 40.8 parts by weight (pbw) of bis (2,3-epoxycyclopentyl) ether to 130° while stirring, and then adding 10.2 pbw of Ultem 1000 polyether imide resin. Stirring and heating was continued at 130° while the resin dissolved, about one hour, and then 48.1 pbw of 4,4'-bis (3-aminophenoxy) diphenyl sulfone were added, cooling the mixture to 90°. The mixture was stirred and heated at 105° for about 10 minutes then cooled to 80° and 0.9 pbw of BF3-triethanolamine complex was added with vigorous stirring. After an additional 10 min. of stirring, the resin was discharged from the reaction vessel and cooled.

The thermosetting epoxy formulation was coated on 13.5 in. width silicone-coated release paper, obtained as W-89-SPT-6BE/PST3A from Mead Release Products Company. The coating was made at a coating weight of 41 g/m$^2$, to provide two rolls of coated paper. A 12 in. wide ribbon of carbon fiber was formed from 105 tows of carbon fiber. A prepreg machine was used to form the prepreg by sandwiching the ribbon between films from the two rolls and pressing to provide a tape having 67 wt.% carbon fiber, a fiber areal weight of 145 g/m$^2$, and a thickness of about 5.5 mils.

The prepreg tape was laid up into 15×15 inch laminates with a ply configuration of $[+45/90/-45/0]_{4S}$ and cured in an autoclave under 90 psi pressure at 355° F. for 2 hr. The resulting composite panel, after cooling, was used to provide test specimens for Compression After Impact evaluations.

Control Example B.

An EP-2 epoxy resin formulation with polyarylate thermoplastic was prepared by heating 32 pbw of an epoxy novolac resin, with stirring, to 160° and then adding 11 pbw of Ardel D-100 polyarylate. The mixture was held at 160° with stirring for 60 min, cooled to 100° and then 25 pbw of tetraglycidyl methylene dianiline and 32 pbw of trimethylene glycol bis(p-aminobenzoate) were added. Stirring was continued until the ester dissolved, about 20 min., and the mixture was then discharged and cooled.

A prepreg was prepared and formed into a composite, substantially by the processes employed for the composite of Control Example A. The composite panel was cut to form test specimens.

Control Example C.

Additional composites were prepared as Control Example C using substantially the same procedures as those used for Control Example A, substituting the EP-3 epoxy resin formulation. Minor changes in handling were employed to accommodate slight differences in the physical characteristics of the resin formulation, as will be readily understood by those skilled in the epoxy resin formulating art.

Control Example D.

An EP-4 epoxy resin formulation was prepared by heating a solution of 675 pbw of the triglycidyl p-aminophenol and 950 pbw of the tetraglycidyl methylene dianiline in 2000 pbw of methylene chloride to 45°. The mixture was stirred and methylene chloride was distilled while adding 400 pbw polyether sulfone. The stirred mixture was further heated to remove methylene chloride, finally at a reduced pressure of 28 in., to a final temperature of 110° and held at that temperature for 1 hr. The diaminodiphenyl sulfone, 465 pbw, was then added over a 5 min. period and the mixture was then stirred at 100° for 1 hr., under a vacuum of 28 in. to remove residual solvent. After the temperature was reduced to 90°, 10 pbw of the Omicure 94 was added, stirring was continued for 5 min. and the resin was discharged.

The resin was used to prepare prepreg and composite substantially by the procedures of Control Example A.

EXAMPLE 1

An EP-1 epoxy resin formulation filled with ABS-2 particles was prepared by placing 45 pbw of a solution of bis (2,3-epoxycyclopentyl) ether and Ultem 1000 polyether imide (80/20 wt. ratio) into a sigma blade mixer. ABS-2 particles, 12 pbw, were added while stirring and heating the mixture to 120°, followed by 42.2 pbw 4,4'-bis (3-aminophenoxy) diphenyl sulfone. The resin was mixed at 120° for 10 min., cooled to 70°, 0.8 pbw BF3-triethanol amine complex was added and the mixture was then stirred for 10 minutes, discharged and cooled.

Films of the particle-filled resin formulation were prepared by coating the formulation on release paper at a coating weight of 32 g/m². Prepreg tape having a fiber content of 74 wt.%, prepared substantially as in Control Example A, was then coated on one side in a second operation by passing a layer of the prepreg with a layer of the film through the prepreg machine. The final prepreg had approximately 67 wt.% carbon fiber, with about 4.6 wt.% of the particulate modifier, based on overall weight of matrix resin plus modifier, dispersed in the resin as a coating on one surface.

Composite panels were prepared substantially following the procedure of Control Example A, and cut into specimens for testing.

EXAMPLE 2.

An EP-2 resin formulation filled with an ABS-1 particulate modifier was prepared by combining a preblend of 28.1 pbw of epoxy novolac resin and 9.7 pbw of Ardel D-100 polyarylate at 90° in a sigma blade mixer with 22 ppw of the tetraglycidyl methylene dianiline and stirring until homogeneous. ABS-2 particles, 12 pbw, were then added, the mixture was heated and stirred for 2 hr. at 100°, and 28.1 pbw trimethylene glycol bis(p-aminobenzoate) were added. After stirring an additional 20 min. the mixture was discharged and cooled. The filled resin was formed into a film and combined with prepreg having a fiber content of 74 wt% prepared as in Control Example B to form a composite by generally following the procedures of Example 1.

EXAMPLE 3.

A sample of EP-3 resin, 93.8 pbw, was charged to a sigma blade mixer and sheared for 10 min., to a resin temperature of 35°, then 6.2 pbw of ABS-1 particles were added. After mixing about 20 min. to uniformly disperse the particles, the resin was discharged.

Films of the filled resin were formed by coating at a coating weight of about 43 g/m². A dry fiber web was then sandwiched with two such filled resin films in a prepreg machine to provide prepreg having particles dispersed in the resin at both surfaces with a fiber areal weight of 145 g/m² and a resin content of 37 wt%. The majority of the carboxylated rubber particles were localized at the surfaces of the prepreg. Composite panels were formed substantially by the processes of Control Example A. The composite compositions and properties are summarized in Table I.

EXAMPLE 4.

An EP-4 epoxy resin formulation filled with ABS-1 particles was prepared by placing 88 pbw of EP-4 resin into a sigma blade mixer, mixing to a temperature of 45°, then adding 12 pbw of ABS-1 particles and stirring until the particles were uniformly dispersed, about 10 min., and discharging the resin. The filled resin was formed into a film by coating on release paper at a coating weight of 32 g/m², then combined with prepreg of Control Example D having a fiber content of 73 wt.% following substantially the procedure of Example 1 to give a final prepreg containing 37.6 wt.% resin with about 4.6 wt.% of the particulate modifier, based on overall weight of matrix resin plus modifier, dispersed in the resin as a coating on one surface. Composite panels were prepared for testing in Control Example A.

TABLE I

| Ex. No. | Epoxy | Filler (wt %) | Fiber (wt %) | thickness (in.) | CAI (kpsi) |
| --- | --- | --- | --- | --- | --- |
| A | EP-1 | none | 67.0 | 0.175 | 30.2 |
| 1 | EP-1 | ABS-2 4.6 | 64.3 | 0.180 | 49.5 |
| B | EP-2 | none | 63.7 | 0.187 | 29.6 |
| 2 | EP-2 | ABS-1 4.4 | 62.0 | 0.191 | 37.9 |
| C | EP-3 | none | 63.7 | 0.178 | 31.6 |
| 3 | EP-3 | ABS-1 6.2 | 63.0 | 0.186 | 47.7 |
| D | EP-4 | none | 64.2 | 0.185 | 28.0 |
| 4 | EP-4 | ABS-1 4.5 | 62.4 | 0.188 | 37.3 |

Notes:
EP-I, etc. are Epoxy formulations; these and the abbreviations for filler particles are summarized in text; Filler content is wt. % based on resin content plus filler; Fiber content is wt % based on total composite; CAI = Compression After Impact; see text for testing procedures.

It will be apparent from a consideration of the residual compressive strengths of the examples and a comparison with the corresponding control examples that dispersing particles of carboxylated rubber in the matrix resin within the inter-ply spacing affords a substantial improvement in composite toughness. For example, carboxylated styrene-butadiene-acrylonitrile terpolymer rubber particles produce an increase of from 9 to nearly 20 kpsi when added to a variety of matrix resin formulations. Compare Examples 1 with A, 2 with B, 3 with C and 4 with D.

Control Example E.

A composite based on an epoxy matrix resin formulation typical of those disclosed in the art as forming a phase-separated morphology upon curing was prepared and tested. The resin formulation:

| component | pbw |
| --- | --- |
| Bisphenol F epoxy resin Epiclon 830 from Dianippon Ink | 28.0 |
| O,N,N' triglycidyl p-aminophenol, MY 0510 epoxy resin from Ciba Geigy | 22.0 |
| 3,3'-diaminodiphenyl sulfone, HT 9719 amine hardener from Ciba Geigy | 22.0 |
| Amine-terminated polysulfone of p-aminophenol, dichlorodiphenyl sulfone and bisphenol A with Mn = 4000; see U.S. Pat. No. 3,895,064 | 25.0 |
| total: | 97.0 |

The formulation was prepared by mixing the Bisphenol F resin with the amine-terminated polysulfone at 130° until completely dissolved, adding the remaining epoxy resin, cooling to 100°, then adding amine hardener, stirring an additional 10 min. and discharging the resin.

The thermosetting epoxy formulation was coated on 13.5 in. width silicone-coated release paper, obtained as W-89-SPT-6BE/PST3A from Mead Release Products Company. The coating was made at a coating weight of 41 g/m$^2$, to provide two rolls of coated paper. A 12 in. wide ribbon of carbon fiber was formed from 105 tows of carbon fiber. A prepreg machine was used to form the prepreg by sandwiching the ribbon between films from the two rolls and pressing to provide a tape having 63.8 wt.% carbon fiber and a fiber areal weight of 144 g/m$^2$.

The prepreg tape was laid up into 15 X 15 inch laminates with a ply configuration of [+45/90/-45/0]4S and cured in an autoclave under 90 psi pressure at 355° F for 2 hr. The resulting composite panel, after cooling, was used to provide test specimens for Compression After Impact evaluations. The CAI value for the 0.178 in thick panel specimens was 34.0 kpsi.

In the following Examples 5 and 6, the method of this invention was used to toughen composites based on an epoxy matrix resin formulation typical of those disclosed in the art to form a matrix resin with phase-separated morphology upon curing.

EXAMPLE 5.

An epoxy resin formulation filled with ABS-1 particles was prepared and tested. The epoxy resin formulation was as follows:

| component | pbw |
| --- | --- |
| Bisphenol F epoxy resin Epiclon 830 from Dianippon Ink | 25.4 |
| O,N,N' triglycidyl p-aminophenol, MY 0510 epoxy resin from Ciba Geigy | 20.0 |
| 3,3'-diaminodiphenyl sulfone, HT 9719 amine hardener from Ciba Geigy | 20.0 |
| Amine-terminated polysulfone of p-aminophenol, dichlorodiphenyl sulfone and bisphenol A with Mn = 4000; see U.S. Pat. No. 3,895,064 | 22.6 |
| ABS-1 particles | 12.0 |
| total: | 100.0 |

A preblend of the bisphenol F epoxy and amine-functional polysulfone, 48 pbw, was heated to 120° C. in a sigma blade mixer, and 12 pbw of ABS-1 were added. After stirring for 1 hr. at 150°, the mixture was cooled to 100°, then blended with 20 pbw of the triglycidyl p-aminophenol, followed by 20 pbw of the diamine hardener. The resin was mixed for an additional 15 min. and then discharged.

A film of the filled formulation was prepared by coating the formulation on release paper at a coating weight of 30 g/m$^2$. Prepreg tape having a fiber content of 73 wt. %, prepared substantially as in Control Example A, was then coated on one side in a second operation by passing a layer of the prepreg with a layer of the film through the prepreg machine to provide final prepreg with a fiber content of 63.8 wt% and a fiber areal weight of 144 g/m$^2$ having ABS-1 rubber particles dispersed in the resin coating on one surface. The coated prepreg was then laid up as in Control Example E and cured to provide a composite panel having a fiber content of 63.2 wt%, a thickness of 0.186 in, and a CAI value of 49.4 kpsi.

EXAMPLE 6.

An epoxy resin formulation filled with Acrylic-1 particles was prepared and tested. Epoxy resin formulation of Control Example E, 88 pbw, was frozen, crushed and placed in a sigma blade mixer and mixed. When the resin was homogeneous and had reached a temperature of 35±40° C., 12 pbw of Acrylic-1 were added. After stirring until the particles were dispersed, the mixture was then discharged.

A coated prepreg was prepared substantially as in Example 5 by preparing a film of the filled formulation at a coating weight of 30 g/m2, then combining with prepreg having a resin content of 73 wt% fiber prepared substantially as in Control Example E to provide final prepreg with a fiber content of 63.2 wt% and a fiber areal weight of 144 g/m$^2$ having Acrylic-1 rubber particles dispersed in the resin coating on one surface. The coated prepreg was then laid up as in Example 1 and cured to provide a composite panel having a fiber content of 55.7 wt%, a thickness of 0.186 in and a CAI value of 39.1 kpsi.

It will thus be apparent that adding pre-formed particles of carboxylated rubber to composites based on matrix resins described in the prior art as having a phase-separated morphology may provide an improvement in CAI properties when the rubber employed has a suitably high Tg.

COMPARATIVE EXAMPLES

Composites were prepared for comparison purposes by using preformed soft, rubbery particles as the modifier.

Comparative Example F.

A prepreg was prepared using an epoxy resin formulation similar to EP-2, with 26.6 pbw N,N,N',N'-tetra-glycidyl 4,4'-methylene dianiline, 30.0 pbw epoxidized novolac resin and 32.4 pbw trimethylene glycol bis(p-aminobenzoate). Prepreg was made using Thornel ® T-40 grade carbon fiber, and layed up to form a composite substantially as described in Control Example A, but with a cure cycle of 2 hr. at 300° F. The composite had a CAI of 26.2 kpsi.

A second prepreg was prepared substantially by the procedures of Example 3, using a film of rubber modified matrix resin having 10 wt% rubber particles with an ave. particle size of 20 microns. The rubber particles were spray-dried rubber with a Tg of minus 19°, obtained as Hycar 1422 from B.F. Goodrich. The rubber modified prepreg was laid up into a composite and cured using the procedures as above. The composite had a CAI of 19.2 kpsi, significantly lower than the composite without rubber.

It will thus be apparent that the use of particulate modifiers comprising soft, rubbery particles with low Tg which are not capable of maintaining the desired ply spacing during fabrication is not effective in improving the toughness of composites.

Comparative Example G.

A composite having a rubber particle-filled, phase-separated epoxy resin matrix was prepared and tested. Prepreg having a resin content of 29 wt% was first prepared using the formulation and procedures of Comparative Example E.

A quantity of the matrix resin formulation with rubber modifier was then prepared using Hycar 1072×28 cross-linked, carboxylated nitrile rubber having two measurable Tg values of minus 31° and minus 18°, obtained from B.F. Goodrich. Hycar carboxylated nitrile rubbers typically have carboxyl contents in the range of 1 to 4 wt %. The bulk rubber was dispersed in the resin by charging the rubber to a sigma blade mixer and shearing for 10 min., then adding a preblend of the epoxy resin and polysulfone and heating at 135° for 3 hr. The mixture was cooled to 100° and the remaining ingredients were added. Stirring was continued an additional 20 min. before discharging the resin at 80°. The average rubber particle size, by photomicrography, was 50 microns, and the resin formulation comprised 12 wt% rubber. The resin was made into a film at a coating weight of 20 g/m², and used to coat the prepreg on one side, giving a final prepreg with 36 wt% resin at a fiber areal weight of 146 g/m². The prepreg was then laid up and cured as in Control Example E to form a composite panel having a fiber content of 64.8 wt%. The CAI value for the composite panel specimens was 27 kpsi.

It will thus be clear that the use of preformed rubber particles for toughening composites based on matrix resins having a phase-separated morphology will be unsuccessful when the rubber particles are formed from carboxylated rubbers with a low Tg.

As is disclosed in the art a combination of low Tg rubber and phase-separated morphologies may be used to toughen composites. However, producing such composites requires careful control in order to be successful. Proper gelation and in situ particle formation during the cure cycle are highly dependent upon resin composition, curing conditions, aging and thermal history of the prepreg and other factors which will necessarily vary with the methods used in the fabrication of parts. The complexities of producing such materials by in situ production of particles thus favors the use of alternative methods.

The process of this invention, in which a preformed, high Tg carboxylated rubber particle is added to the matrix resin prior to curing, permits the use of conventional, easily controlled process steps to produce improved toughened composites. The method of this invention thus clearly represents an improvement over the processes disclosed in the art for toughening such composites.

The invention will thus be seen to be an improved matrix resin formulation for use in producing toughened composites and carboxylated rubber particles for use in toughened, fiber-reinforced composite structures. The toughened composites comprise discrete layers formed of continuous fiber embedded in a matrix resin, the layers being separated or spaced normally apart to form laminar regions comprising matrix resin filled with a preformed carboxylated rubber particles. The improved matrix resin formulation comprises a thermoset resin formulation, preferably based on an epoxy resin.

Composites based on these matrix resins include a plurality of discrete layers or plies comprising continuous fiber imbedded in matrix resin. The improvement comprises including preformed particles formed of a carboxylated rubber in the matrix resin component within the inter-ply spacing of the layered composite as a modifier to improve toughness. The particulate modifier separates the plies and maintains the spacing between the plies during fabrication, and will be formed of carboxylated rubber particles selected to have a Tg above about 15° with sufficient rigidity and hardness to withstand the pressures and temperatures encountered in composite fabrication. The particulate modifier will comprise particles lying in the range of from 1 to about 75 microns in size, defined as the particle's smallest dimension, and will be selected to have the majority of particles of a size to provide the desired inter-ply spacing, normally in the range of from 1 to about 75 microns.

Further modifications and variations will become apparent to those skilled in the resin formulating and composite fabricating art, and such variations and modifications will lie within the scope of the invention as defined by the appended claims.

We claim:

1. Particles having a smallest dimension in the range of from 1 to about 75 microns comprising a cross-linked carboxylated rubber selected from the group consisting of carboxylated diene rubbers and carboxylated acrylic rubbers, said carboxylated rubber having from 0.1 to 5 wt% carboxyl functionality and a Tg above 15° C., said particles being formed by spray-drying.

2. The rubber particles of claim 1 wherein said particles are formed of a carboxylated rubber selected from the group consisting of carboxylated styrene-butadiene-acrylonitrile terpolymers, carboxylated acrylic rubbers and mixtures thereof.

3. The particles of claim 1 wherein said carboxylated rubber has from about 0.5 to about 3 wt% carboxyl functionality.

4. The particles of claim 1 wherein said carboxylated rubber is a carboxylated styrene-butadiene-acrylonitrile terpolymer having a Tg of about 26° C.

5. The particles of claim 1 wherein saidcarboxylated rubber is a carboxylated acrylic rubber having a Tg of about 20° C.

6. Particles having a smallest dimension in the range of from 1 to about 75 microns comprising a carboxylated rubber selected from the group consisting of carboxylated styrene-butadiene-acrylonitrile terpolymers having a Tg of about 26° C. and carboxylated acrylic rubbers having a Tg of about 20° C., said carboxylated rubber having from 0.1 to 5 wt% carboxyl functionality, said particles being formed by spray-drying.

* * * * *